(12) United States Patent
Ozaki et al.

(10) Patent No.: US 10,370,154 B2
(45) Date of Patent: Aug. 6, 2019

(54) PACKING BAG AND MANUFACTURING METHOD FOR THE PACKING BAG

(71) Applicant: MUPACK OZAKI CO., LTD., Yao-shi (JP)

(72) Inventors: Ikuko Ozaki, Yao (JP); Takeo Takashiro, Yao (JP)

(73) Assignee: MUPACK OZAKI CO., LTD., Yao-shi (JP)

( * ) Notice: Subject to any disclaimer, the term of this patent is extended or adjusted under 35 U.S.C. 154(b) by 199 days.

(21) Appl. No.: 15/266,347

(22) Filed: Sep. 15, 2016

(65) Prior Publication Data
US 2018/0009574 A1 Jan. 11, 2018

(30) Foreign Application Priority Data

Jul. 7, 2016 (JP) .................................. 2016-135021

(51) Int. Cl.
| | |
|---|---|
| *B65D 33/00* | (2006.01) |
| *B65D 75/58* | (2006.01) |
| *B65D 33/25* | (2006.01) |
| *B31B 70/00* | (2017.01) |
| *B23K 103/00* | (2006.01) |

(Continued)

(52) U.S. Cl.
CPC .......... *B65D 33/007* (2013.01); *B31B 70/00* (2017.08); *B65D 33/2525* (2013.01); *B65D 33/2591* (2013.01); *B65D 75/58* (2013.01); *B23K 26/364* (2015.10); *B23K 26/402* (2013.01); *B23K 2103/172* (2018.08); *B23K 2103/42* (2018.08); *B31B 70/25* (2017.08); *B31B 2155/00* (2017.08); *B31B 2160/00* (2017.08); *B31B 2170/20* (2017.08); *B65D 33/14* (2013.01)

(58) Field of Classification Search
CPC ................ B65D 33/34; B65D 33/2516; B65D 33/2525; B65D 75/58–75/5844
USPC .... 383/5, 200, 201, 203–209; 229/207, 208, 229/237, 102
See application file for complete search history.

(56) References Cited

U.S. PATENT DOCUMENTS 2,020,804 A * 11/1935 Segal ...................... B65D 33/25
206/260
3,410,476 A * 11/1968 Buttery ................ B65D 5/5415
229/207

(Continued)

FOREIGN PATENT DOCUMENTS

JP          5715283 B1      5/2015

*Primary Examiner* — Jes F Pascua
*Assistant Examiner* — Nina K Attel
(74) *Attorney, Agent, or Firm* — Kratz, Quintos & Hanson, LLP

(57) ABSTRACT

A packing bag to store a stored article Z with tight seal by a welded sheet material 1 of resin in which a separation-prepared line portion 5, separable by predetermined tensile force F by human hands to take out the stored article Z, is provided along an opening-prepared side portion 10, the sheet material 1 has a layered unit construction in which first and second welding resin layers 61A and 61B are disposed on both sides, and a barrier layer 60 is disposed on a middle position, the separation-prepared line portion 5 is composed of a half-cut first laser-worked groove 7A concaved on the first welding resin layer 61A and a half-cut second laser-worked groove 7B concaved on the second welding resin layer 61B, and, the first and second laser-worked grooves 7A and 7B are formed barely damaging the barrier layer 60.

3 Claims, 22 Drawing Sheets

(51) Int. Cl.
*B23K 103/16* (2006.01)
*B23K 26/364* (2014.01)
*B23K 26/402* (2014.01)
*B65D 33/14* (2006.01)
*B31B 155/00* (2017.01)
*B31B 160/00* (2017.01)
*B31B 170/20* (2017.01)

(56) References Cited

U.S. PATENT DOCUMENTS

| | | | | |
|---|---|---|---|---|
| 3,909,582 | A * | 9/1975 | Bowen | B23K 26/0846 |
| | | | | 219/121.69 |
| 5,000,321 | A * | 3/1991 | Heilmann | B29C 59/007 |
| | | | | 229/216 |
| 5,229,180 | A * | 7/1993 | Littmann | B65D 75/5827 |
| | | | | 219/121.68 |
| 7,185,403 | B2 * | 3/2007 | Chaturvedi | B65D 33/2591 |
| | | | | 24/585.12 |
| 2008/0156861 | A1 * | 7/2008 | Sierra-Gomez | B65D 75/5838 |
| | | | | 229/214 |
| 2008/0273821 | A1 * | 11/2008 | Doll | B65B 9/2028 |
| | | | | 383/209 |
| 2011/0297681 | A1 * | 12/2011 | Bowers | B65D 75/585 |
| | | | | 220/266 |
| 2013/0266244 | A1 * | 10/2013 | Doll | B65D 75/5805 |
| | | | | 383/209 |

* cited by examiner

PACKING BAG AND MANUFACTURING METHOD FOR THE PACKING BAG

BACKGROUND OF THE INVENTION

1. Field of the Invention

This invention relates to a packing bag and manufacturing method for the packing bag.

2. Description of the Related Art

Conventionally, the applicant of the present application has proposed a packing bag formed by welding a sheet material of synthetic resin to tightly seal and preserve stored articles with sanitation (refer to Japanese Patent No. 5715283).

In the packing bag disclosed by Japanese Patent No. 5715283, as shown in FIG. 32, a heated blade contacts a face 40a of a sheet material 40 to form a half-cut V-shaped groove 48, and a separation-prepared line portion 49 to be separated by human hands is formed with the V-shaped groove 48.

However, in a case that the sheet material 40 has welding resin layers 46A and 46B on both sides 40a and 40b, and a barrier layer 47 in the middle, the V-shaped groove 48 penetrates (breaks) the barrier layer 47 and barrier function is greatly reduced.

And, when the depth of the V-shaped groove 48 does not reach for the barrier layer 47, separation of the separation-prepared line portion 49 is difficult.

Therefore, it is an object of the present invention to provide a packing bag and manufacturing method for the packing bag with which the separation-prepared line portion can be smoothly separated, and the barrier function can be certainly kept.

DESCRIPTION OF THE PREFERRED EMBODIMENTS

Preferred embodiments of the present invention will now be described with reference to the accompanying drawings.

Figure 1:
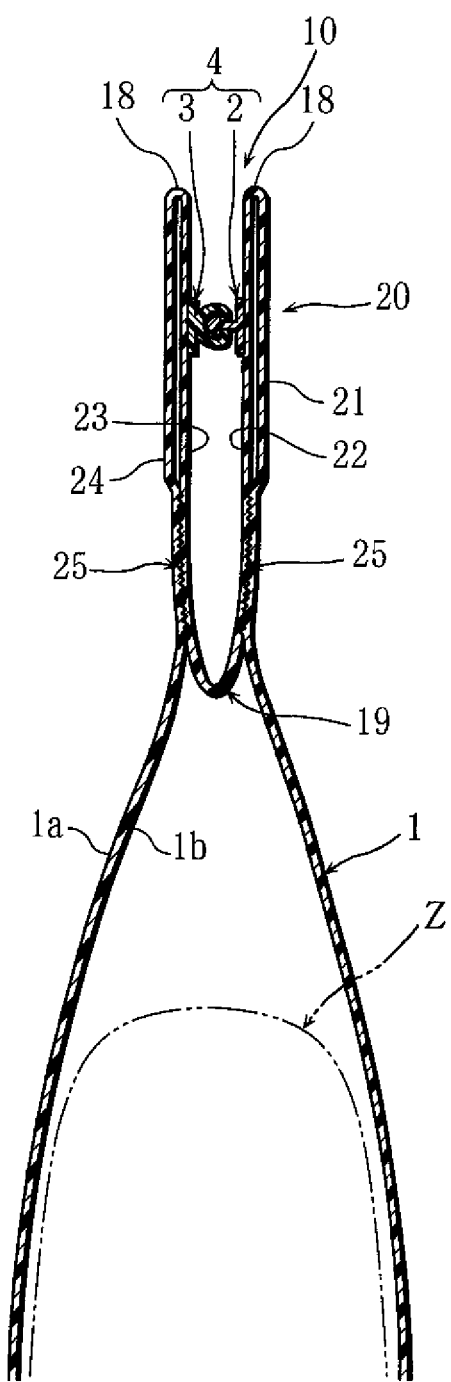
FIG. 1 is a cross-sectional view of a principal portion showing an embodiment of the present invention.
Figure 2:
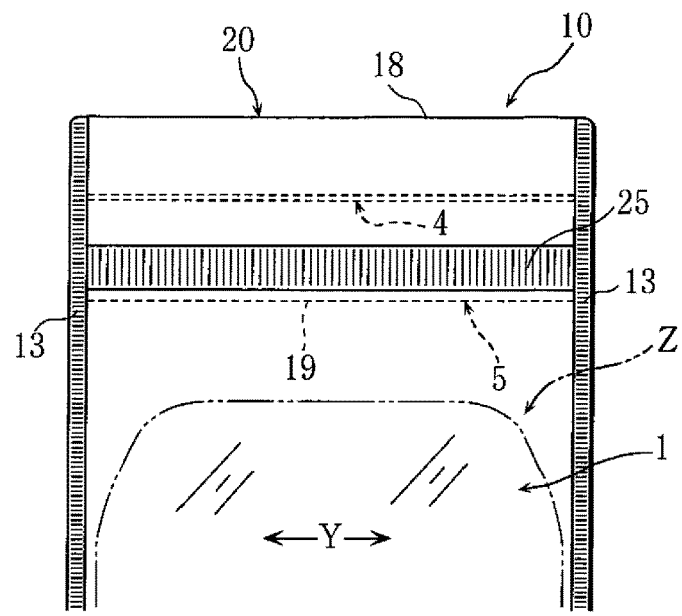
FIG. 2 is a front view of a principal portion.

As shown in FIG. 1 and FIG. 2, in a packing bag of the present invention composed of a rectangular sheet material 1 of synthetic resin and a fastener 4, the sheet material 1 is folded on two convex folded line portions 18 and one concave folded line portion 19, and a folded portion 20, M-shaped in longitudinal cross section and serially having a first sheet portion (layer) 21, a second sheet portion (layer) 22, a third sheet portion (layer) 23, and a fourth sheet portion (layer) 24.

In the packing bag of the present invention, both of left and right end edge portions 13 are welded to form a bottom opening portion down out of figures, and a stored article Z is put into the bottom opening portion, the bottom opening portion is welded to close for storing the stored article Z with tight seal. And, a side portion on which the folded portion 20 is formed is an opening-prepared side portion 10 to become an opening for taking out the stored article Z after the storing of the stored article Z with tight seal.

In the folded portion 20, a (first) welded portion 25 of thin belt shape in left-and-right direction (bag width direction Y) is formed by welding the first sheet portion 21 and the second sheet portion 22 near the concave folded line portion 19. And, a (second) welded portion 25 of thin belt shape in left-and-right direction is formed by welding the third sheet portion 23 and the fourth sheet portion 24 near the concave folded line portion 19. Each of the welded portions 25 is formed near the concave folded line portion 19 as to make a distance between a lower end edge of the welded portion 25 and the concave folded line portion 19 smaller than the width of the welded portion 25.

In the folded portion 20, the fastener 4, which can tightly seal the second sheet portion 22 and the third sheet portion 23 mutually, is provided.

Figure 6:
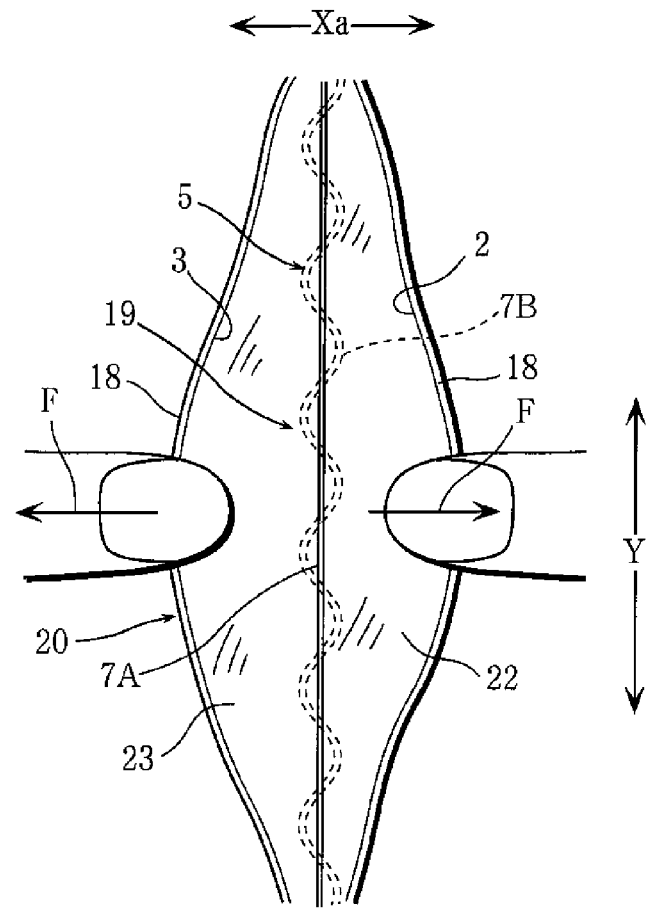
FIG. 6 is a top view showing a used state.
Figure 7:
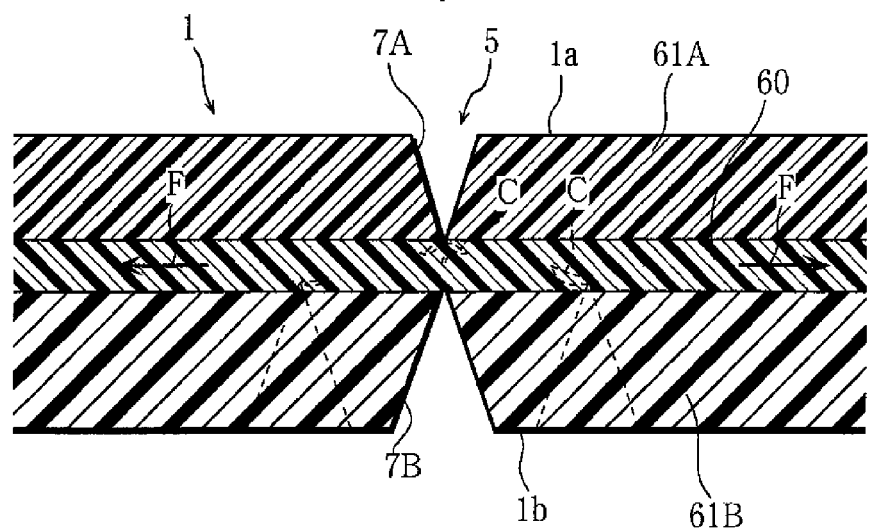
FIG. 7 is an enlarged cross-sectional view of a principal portion just before the separation of the separation-prepared line portion.

The fastener 4 is composed of a chuck tape male portion 2 having a convex portion and a chuck tape female portion 3 having a concave portion to which the convex portion fits, and the chuck tape male portion 2 and the chuck tape female portion 3 are welded to inner faces near the convex folded line portions 18 of the second sheet portion 22 and the third sheet portion 23 as to make the convex portion and the concave portion facing. With the fastener 4, the fitting of the convex portion and the concave portion is released by holding and pulling near the convex folded line portion 18 of the first sheet portion 21 and the second sheet portion 22 and near the convex folded line portion 18 of the third sheet portion 23 and the fourth sheet portion 24 by fingers to open the fastener 4 (refer to FIG. 6). The convex portion and the concave portion can be fit by holding the outer face of the folded portion 20 by fingers to mutually press the chuck tape male portion 2 and the chuck tape female portion 3 to close the fastener 4.

Figure 3:
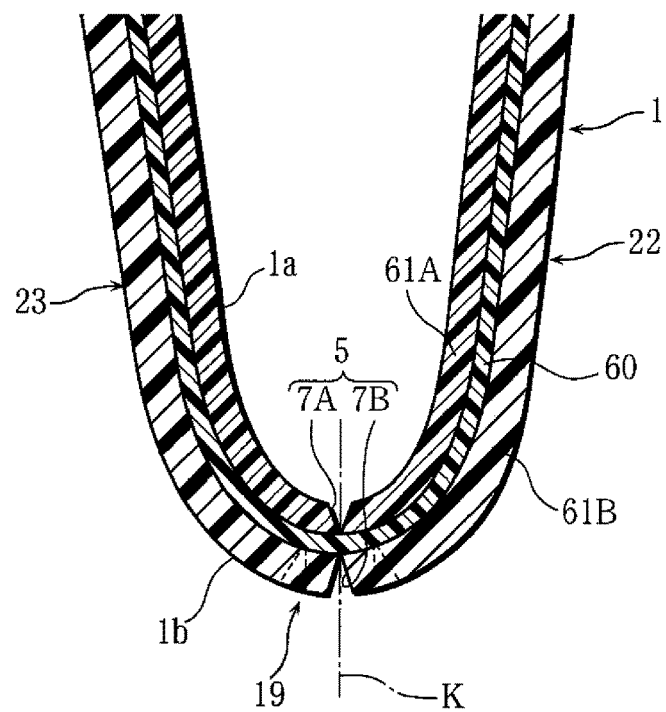
FIG. 3 is an enlarged cross-sectional view of a principal portion.

The sheet material 1 has a layered unit construction in which first and second welding resin layers 61A and 61B are disposed on the both sides, and a barrier layer 60 is in the middle as shown in FIG. 3.

In other words, the construction has the first welding resin layer 61A (called the first layer 61A in some cases below) forming a face 1a, the second welding resin layer 61B (called the second layer 61B in some cases below) forming another face 1b, and the barrier layer 60 disposed between the first layer 61A and the second layer 61B. Not restricted to the three-layer construction in figures, the construction may be a multilayer construction having more than 3 layers (4 or 5 layers). For example, a reinforcing resin layer may be disposed between the first layer 61A and the barrier layer 60, and between the second layer 61B and the barrier layer 60. Especially, transparent resin is preferable for the reinforcing resin layer.

The first and second layers 61A and 61B are formed with polyolefin resins such as polypropylene (PP) and polyethylene (PE) which can be welded.

And, the first and second layers 61A and 61B may be composed of films comprising plural kinds of resins such as polyolefin compound films.

The barrier layer 60 is formed with resin such as nylon, polyamide, and polyester.

In the present invention, the barrier layer 60 is formed with resin having one or plural functions of gas barrier function (air barrier function), waterproof function (liquid barrier function), and vapor barrier function. Especially, it is preferable to form the barrier layer 60 with nylon having oxygen barrier function.

And, as shown in FIG. 2 through FIG. 5, a separation-prepared line portion 5 to separate the second sheet portion 22 and the third sheet portion 23 is on an inner side to the fastener 4 along the opening-prepared side portion 10 (the concave folded line portion 19). The separation-prepared line portion 5 is not shown in FIG. 1.

The separation-prepared line portion 5 is composed of a half-cut first laser-worked groove 7A (called the first groove 7A in some cases below) concaved on the first layer 61A (the face 1a) of the sheet material 1 and a half-cut second laser-worked groove 7B (called the second groove 7B in some cases below) concaved on the second layer 61B (the other face 1b) of the sheet material 1.

The first and second grooves 7A and 7B are formed barely damaging the barrier layer 60. In the present invention, "formed barely damaging" means that a first intruding depth dimension Sa, for which the first groove 7A intrudes to the barrier layer 60, is equal to or less than 10% of a barrier thickness dimension 160 of the barrier layer 60, and, a second intruding depth dimension Sb, for which the second groove 7B intrudes to the barrier layer 60, is equal to or less than 10% of the barrier thickness dimension T60 of the barrier layer 60. And, a case that the first and second grooves 7A and 7B don't reach for the barrier layer 60 without any damage is included.

A thickness dimension from the face 1a to the barrier layer 60 is called a face side thickness dimension Ta, and a thickness dimension from the other face 1b to the barrier layer 60 is called another face side thickness dimension Tb.

A first groove depth dimension H1 of the first groove 7A is set to be equal to or more than 95% of the face side thickness dimension Ta as to make the first intruding depth dimension Sa equal to or less than 10% of the barrier thickness dimension 160 within a predetermined first depth range.

A second groove depth dimension H2 of the second groove 7B is set to be equal to or more than 95% of the other face side thickness dimension Tb as to make the second intruding depth dimension Sb equal to or less than 10% of the barrier thickness dimension T60 within a predetermined second depth range.

For example, in a case that the face side thickness dimension Ta is 30 μm, the barrier thickness dimension T60 is 15 μm, and the other face side thickness dimension Tb is 40 μm, the first groove depth dimension H1 is set to be 28.5 to 31.5 μm, and the second groove depth dimension H2 is set to be 38 to 41.5 μm.

And, the first groove 7A is formed straight (on a straight line) along the opening-prepared side portion 10 (in the bag width direction Y). The second groove 7B is formed in concavo-convex wave oscillating (meandering) in bag opening directions Xa as to cross the first groove 7A in top view (in grade separation through the barrier layer 60).

Figure 4:
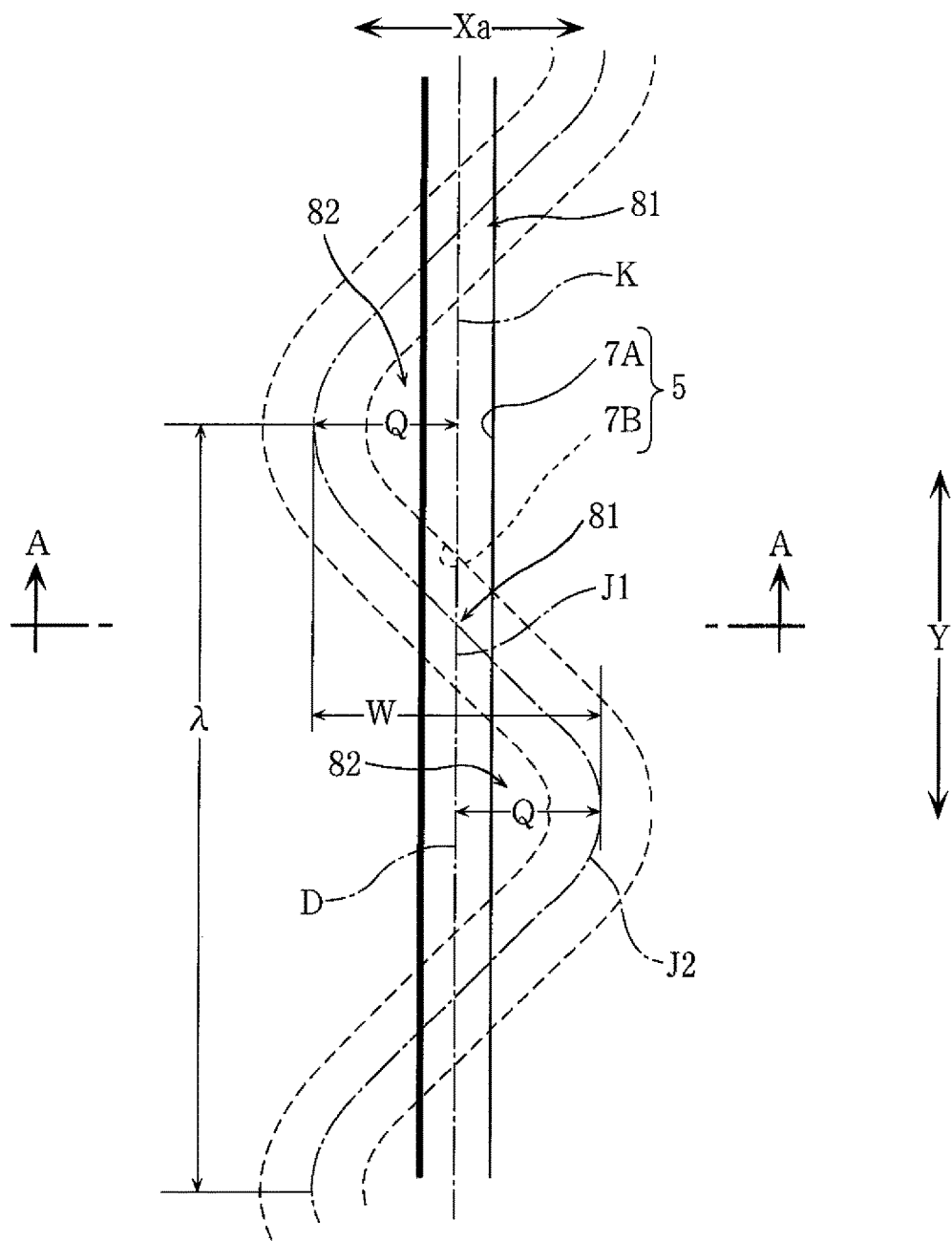
FIG. 4 is a top view of a principal portion.
Figure 5:
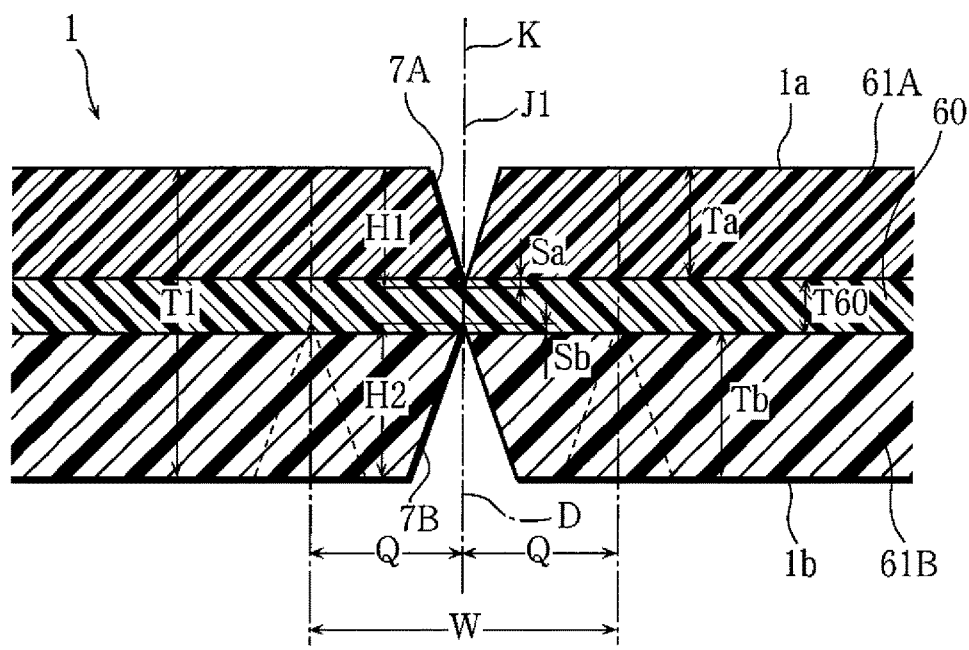
FIG. 5 is a cross-sectional view of FIG. 4 at A-A line.

And, although not shown in figures, the first groove 7A may be formed in concavo-convex wave, and the second groove 7B may be formed straight (on a straight line). FIG. 4 is a top view observed from the face 1a side in which the concave folded line portion 19 is opened flat, and FIG. 5 is a cross-sectional view of FIG. 4 on A-A line.

A first groove width center line J1 of the first groove 7A is disposed as to correspond to a fold back standard center line K of the concave folded line portion 19.

An amplitude standard center line D of concavo-convex wave of the second groove 7B is disposed as to correspond to the fold back standard center line K (the first groove width center line J1).

The first and second grooves 7A and 7B may be disposed to make the first groove width center line J1 and the amplitude standard center line D parallel and departed from the fold back standard center line K.

Figure 11:
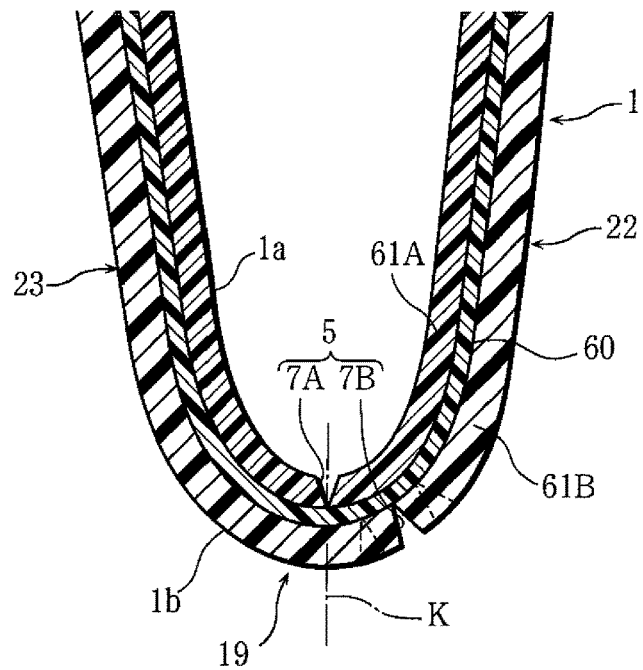
FIG. 11 is a cross-sectional view of a principal portion showing another example of the separation-prepared line portion.
Figure 12:
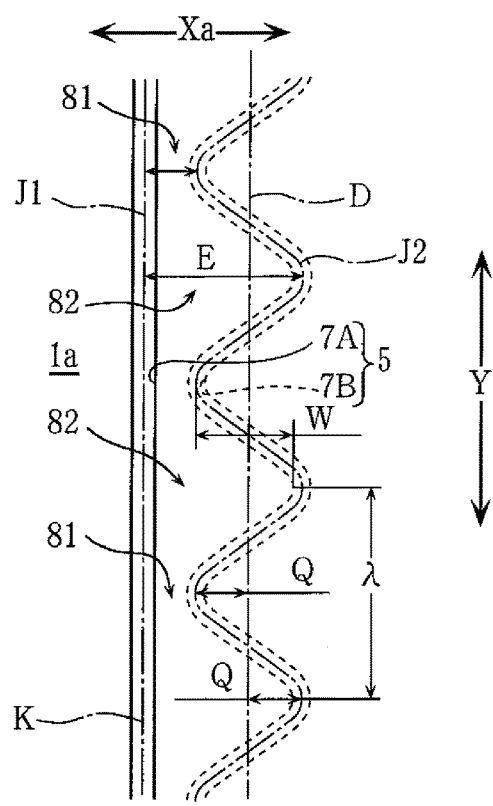
FIG. 12 is a top view of the principal portion showing another example of the separation-prepared line portion.

And, as another example shown in FIG. 11 and FIG. 12, the first groove 7A is formed straight, and the second groove 7B is formed in concavo-convex wave and disposed on one side of the bag opening directions Xa being apart from the first groove 7A without crossing with the first groove 7A in top view.

The first groove width center line J1 is made correspond to the fold back standard center line K, and the amplitude standard center line D of the second groove 7B is disposed on one side of the bag opening directions Xa In FIG. 11 and FIG. 12, the first groove width center line J1 may not correspond to the fold back standard center line K. And, the first groove 7A may be formed in concavo-convex wave, and the second groove 7B may be formed straight. And, a part of a convex portion of the second groove 7B on the first groove 7A side may be crossing the first groove 7A in top view. Other constructions are similar to that of the above-described embodiment.

Figure 13:
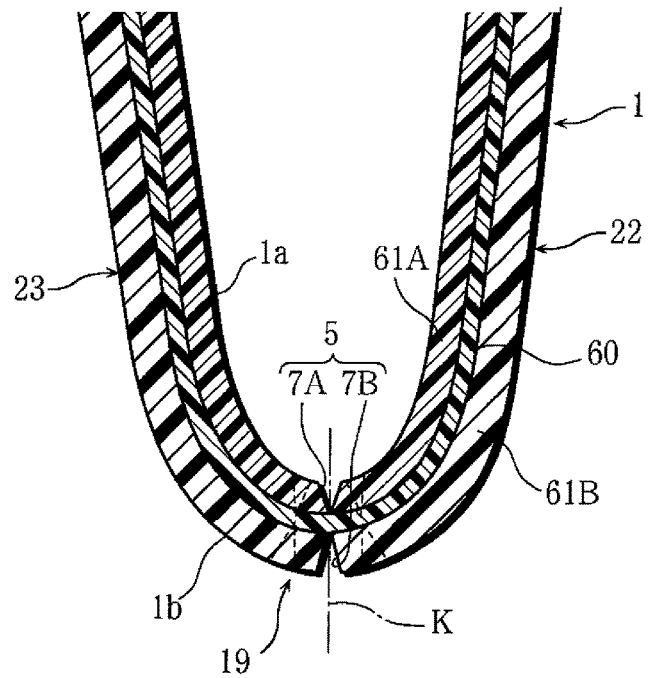
FIG. 13 is a cross-sectional view of the principal portion showing still another example of the separation-prepared line portion.
Figure 14:
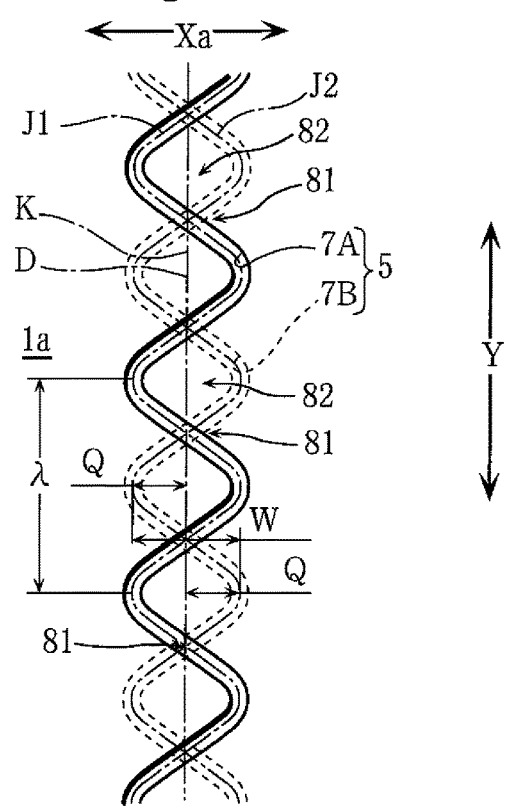
FIG. 14 is a top view of the principal portion showing still another example of the separation-prepared line portion.

And, as still another example shown in FIG. 13 and FIG. 14, the first groove 7A is formed in concavo-convex wave, and the second groove 7B is formed in concavo-convex wave.

Then, the amplitude standard center line D of the first groove 7A and the second groove 7B is made correspond to the fold back standard center line K, and phases of the concavo-convex waves of the first groove 7A and the second groove 7B are made different as to cross the first groove 7A and the second groove 7B in top view (in grade separation through the barrier layer 60).

In FIG. 13 and FIG. 14, wave length λ and amplitude Q of the first groove 7A and the second groove 7B may be different.

The configuration of the concavo-convex wave, the wave length λ, and the amplitude Q of the first groove 7A may correspond to that of the second groove 7B as the first groove 7A and the second groove 7B correspond in top view. And, the amplitude standard center line D may not correspond to the fold back standard center line K. Other constructions are similar to that of the above-described embodiment.

In the concavo-convex wave, the amplitude Q is set to be 0.15 mm to 1 mm when the groove width center lines J1 and J2 are used as standard, in other words, it is preferable to set variable amount (movement stroke dimension in the bag opening directions Xa) W to be 0.3 mm to 2 mm. And, it is preferable to set the wave length λ to be 0.3 mm to 3 mm.

By setting the minimum value as described above, a later-described separation mark 50 (refer to FIG. 10) can be seen by naked eye. And, by setting the maximum value as described above, separation can be easily and smoothly conducted.

And, as shown in FIG. 12, in a case that the first groove 7A and the second groove 7B, at least one of which is concavo-convex, don't mutually cross in top view, it is preferable to set maximum distance dimension E (refer to FIG. 12) of the first groove width center line J1 and the second groove width center line J2 to be equal to or less than 2 mm.

And, the configuration of the concavo-convex wave, not restricted to sinusoidal wave (sine curve) shown in figures, may be rectangular or triangular, or, an irregular concavo-convex wave in which one or plural parameters such as the amplitude Q, the wave length λ, and the phase may be changed.

Figure 15:
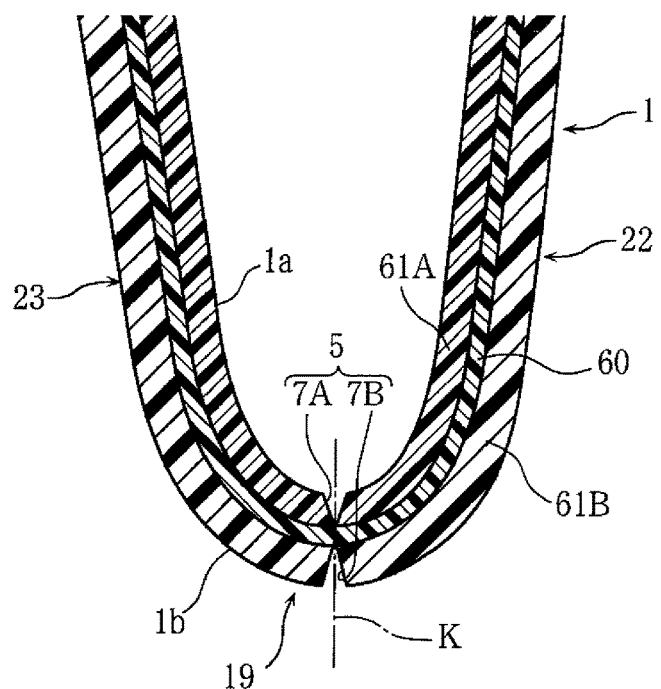
FIG. 15 is a cross-sectional view of the principal portion showing a further example of the separation-prepared line portion.
Figure 16:
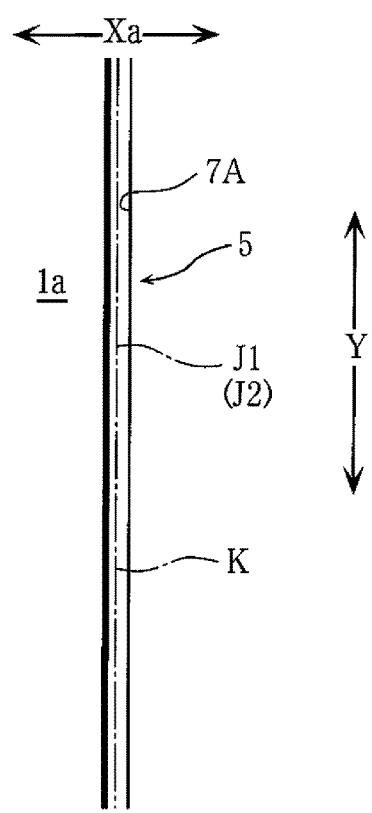
FIG. 16 is a top view of the principal portion showing the further example of the separation-prepared line portion.

Further, a further example of the separation-prepared line portion 5 is shown in FIG. 15 and FIG. 16.

The first groove 7A and the second groove 7B are formed straight along the bag width direction (left-right direction) Y, and the groove width center lines J1 and J2 are made corresponding to the fold back standard center line K to match (correspond) in top view. The groove width center lines J1 and J2 may be parallel (not corresponding) to the fold back standard center line K. Other constructions are similar to that of the above-described embodiment.

Figure 17:
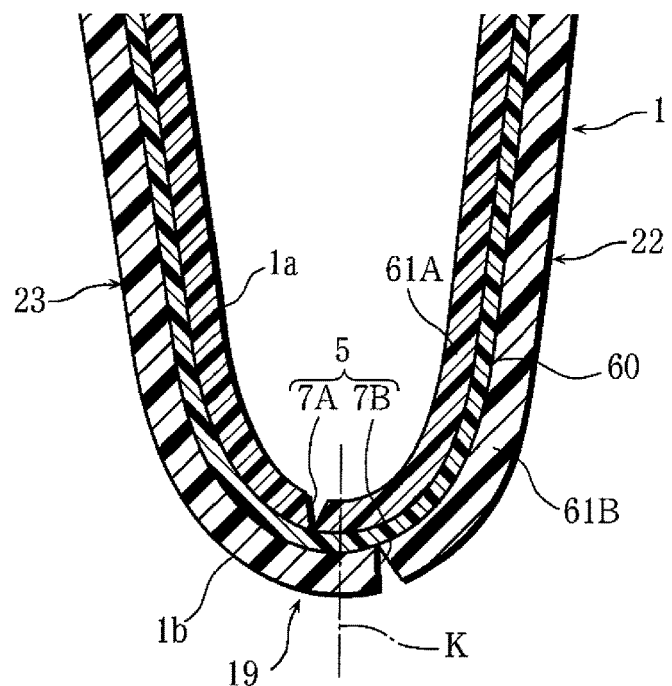
FIG. 17 is a cross-sectional view of the principal portion showing a still further example of the separation-prepared line portion.
Figure 18:
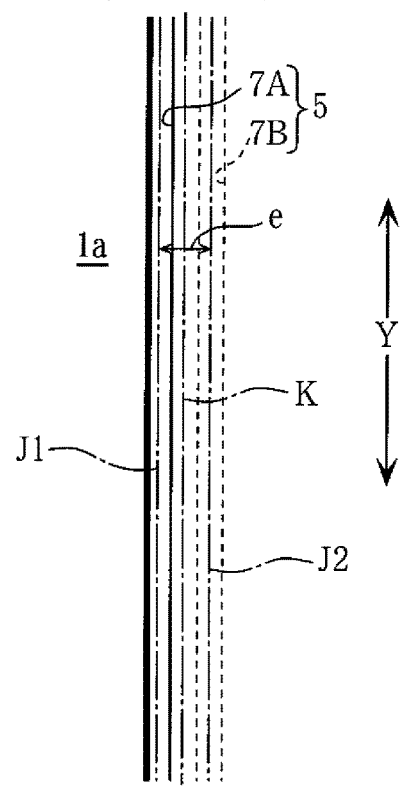
FIG. 18 is a top view of the principal portion showing the still further example of the separation-prepared line portion.

And, a still further example of the separation-prepared line portion 5 is shown in FIG. 17 and FIG. 18.

The first groove 7A and the second groove 7B are formed straight along the bag width direction Y, and the groove width center lines J1 and J2 are made parallel with distances from the fold back standard center line K.

One of the groove width center lines J1 and J2 may be disposed to correspond to the fold back standard center line K.

A distance dimension e of the first groove width center line J1 and the second groove width center line J2 is preferably set to be 10 to 90% of the sheet thickness dimension T1 of the sheet material 1. Other constructions are similar to that of the above-described embodiment.

As described above, forming both of the first groove 7A and the second groove 7B straight and mutually correspond or parallel as shown in FIG. 15 through FIG. 18, the later-described separation mark 50 (refer to FIG. 10) becomes straight to conduct the separation further smoothly (in comparison with the concavo-convex wave), and the separation mark 50 is inconspicuous and excellent in appearance.

Especially, in case of parallel forming with distance in top view, disadvantage that the first groove 7A and the second groove 7B are connected is hardly generated in forming process of the separation-prepared line portion 5 in production, and the separation-prepared line portion 5 can be easily made.

A method of use (function) of the above-described packing bag of the present invention is described.

First, the stored article Z is put in the bag through the bottom opening portion, and the bottom opening portion is closed by welding to store the stored article Z with tight seal (tight seal stored state).

In the tight seal stored state, the stored article Z can be certainly prevented from being humid or dried by the barrier layer 60. And, the stored article Z is protected with sanitation. Especially, in case that the barrier layer 60 has gas barrier function, vacuum preservation is possible by welding of the bottom opening portion with vacuuming.

Then, when the stored article Z in the tight seal stored state is taken out, a position near one side of the convex folded line portion 18 and a position near another side of the convex folded line portion 18 are held by fingers, the folded portion 20 is opened in the bag opening directions Xa to open the fastener 4. In this moment, the separation-prepared line portion 5 is not separated, and tight sealed state is kept in the bag. And, when predetermined tensile force F by human hands is given as to open the folded portion 20 further, cracks C are generated between the first groove 7A and the second groove 7B.

Figure 8:
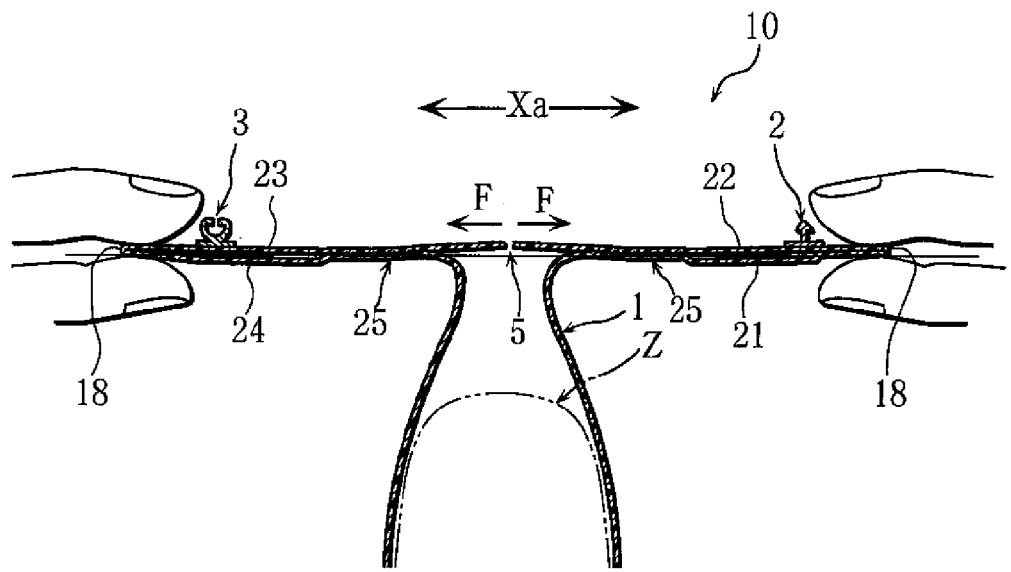
FIG. 8 is a cross-sectional view of the principal portion just after the separation of the separation-prepared line portion.
Figure 9:
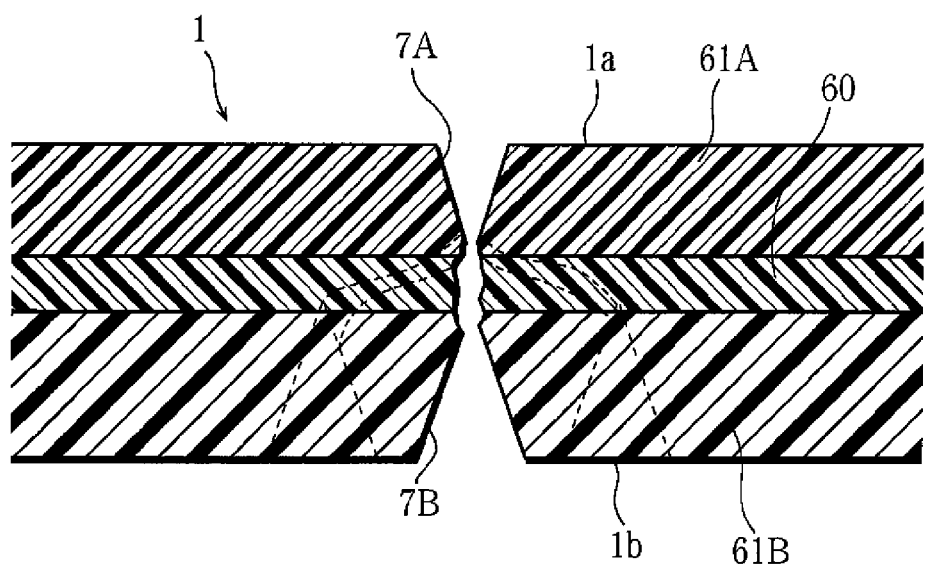
FIG. 9 is an enlarged cross-sectional view of the principal portion just after the separation of the separation-prepared line portion.

As shown in FIG. 8 and FIG. 9, the cracks C from the first groove 7A and the second groove 7B are mutually connected, the second sheet portion 22 and the third sheet portion 23 are separated along the separation-prepared line portion 5 to make the bag open, and the stored article Z can be taken out of the bag from the opening-prepared side portion 10.

The separation-prepared line portion 5, shown in FIG. 4, FIG. 12, and FIG. 14, is separated with concavo-convex configuration because of a proximate position 81, on which the first groove 7A and the second groove 7B mutually come close in the bag opening directions Xa and separation distance is short (easy to separate), and a distant position 82, on which the first groove 7A and the second groove 7B are mutually distant in the bag opening directions Xa and separation distance is long (difficult to separate).

Figure 10:
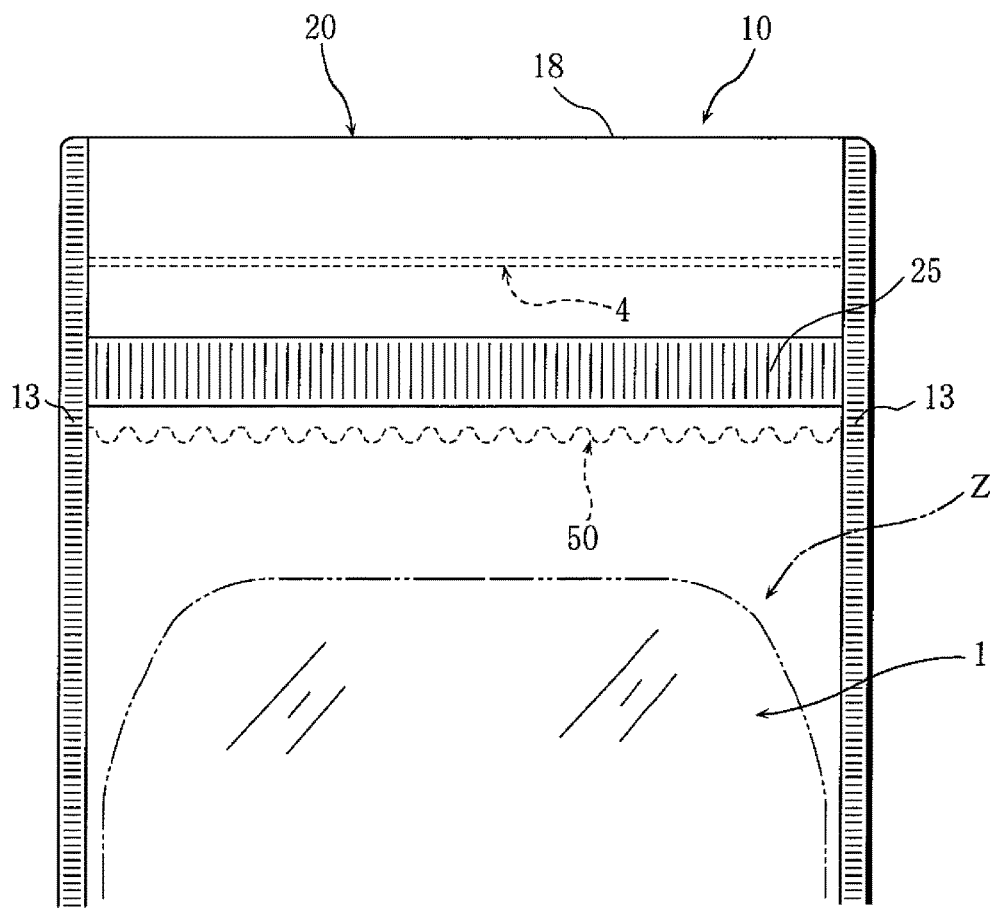
FIG. 10 is a front view of the principal portion after the separation of the separation-prepared line portion.

Therefore, as shown in FIG. 10, when the fastener 4 is closed after the separation of the separation-prepared line portion 5, (if the sheet portion corresponding to the concave folded line portion 19 is not printed and transparent) clear concavo-convex separation mark (separation end edge) 50 is obtained, the separation mark 50 can be seen, and it is easily judged that the bag is opened or not. That is to say, pranks in product display and defective product in production process can be easily found.

And, in the case that the first groove 7A and the second groove 7B are concavo-convex waves and corresponding to each other in top view, although the separation mark 50 in beautiful concavo-convex wave can be obtained because the proximate position 81 and the distant position 82 don't exist, the concavo-convex wave configuration is inconspicuous and the separation mark 50 is slightly difficult to see in comparison with the case that the first groove 7A and the second groove 7B are not corresponding in top view with the fastener 4 closed after the separation of the separation-prepared line portion 5. However, the bag is excellent in appearance.

And, in the case that the separation-prepared line portion 5 is formed as shown in FIG. 15 through FIG. 17, the separation mark 50 is formed straight, inconspicuous after the opening, and excellent in appearance.

The tensile force F given by the human hands is easily transmitted to the separation-prepared line portion 5, and the separation-prepared line portion 5 can be smoothly separated because the first sheet portion 21 and the second sheet portion 22 are welded on the first (one side) welded portion 25, and the third sheet portion 23 and the fourth sheet portion 24 are welded on the second (the other side) welded portion 25. And, the stored article Z can be prevented from intruding between the first sheet portion 21 and the second sheet portion 22 and between the third sheet portion 23 and the fourth sheet portion 24 when taken out, and the stored article Z does not hitch to the second sheet portion 22 and the third sheet portion 23 and does not make the takeout difficult. Once opened, quasi-tight sealed state can be made by closing the fastener 4.

Figure 19:
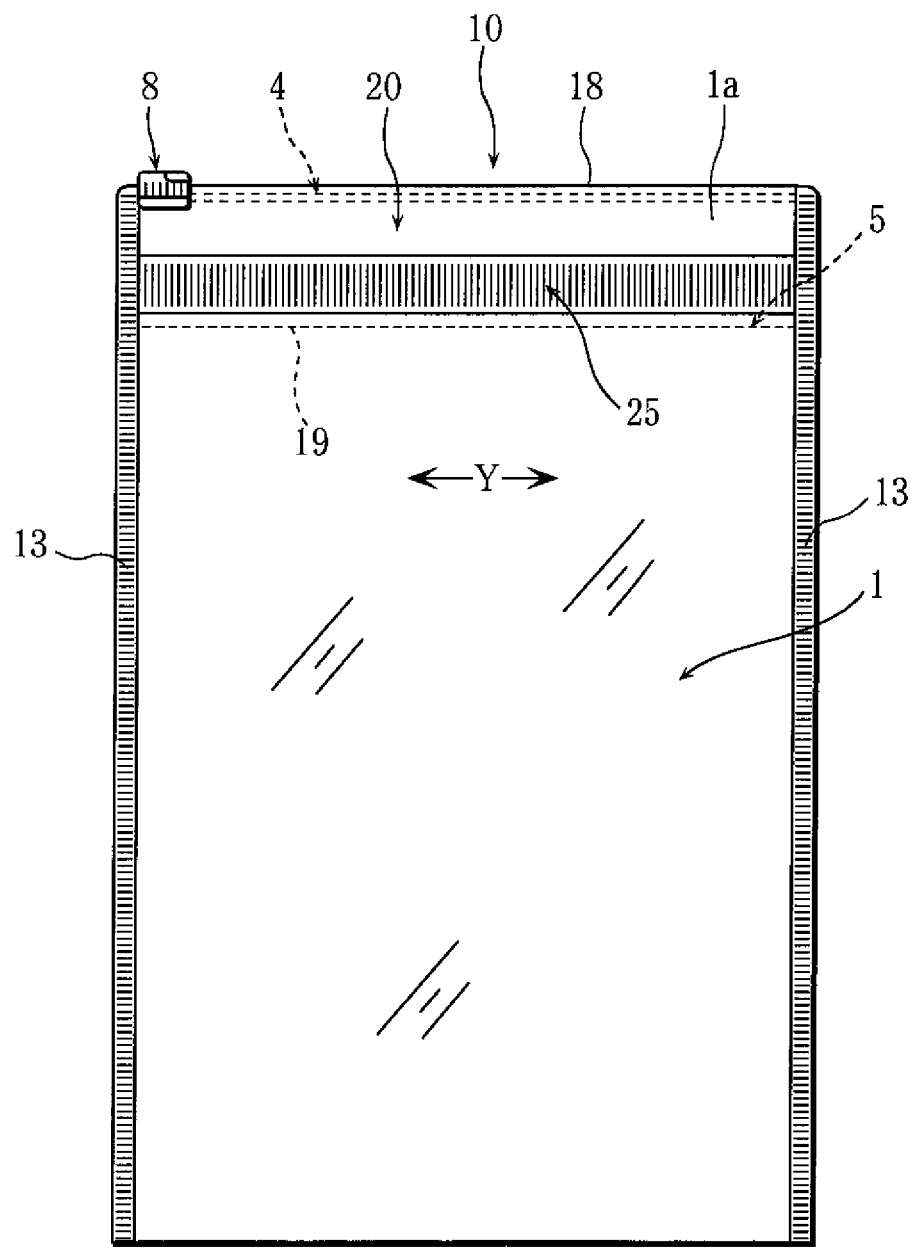
FIG. 19 is a front view showing another embodiment of the packing bag.

And, as shown in FIG. 19, a slider 8 to open and close the fastener 4 may be provided. The slider 8 has a construction in which two plastic parts are combined to be attached to the folded portion 20. The slider 8 is composed by connecting two parts. One of the parts plays a role of opening the fastener 4, and the other plays a role of closing the fastener 4.

Figure 20:
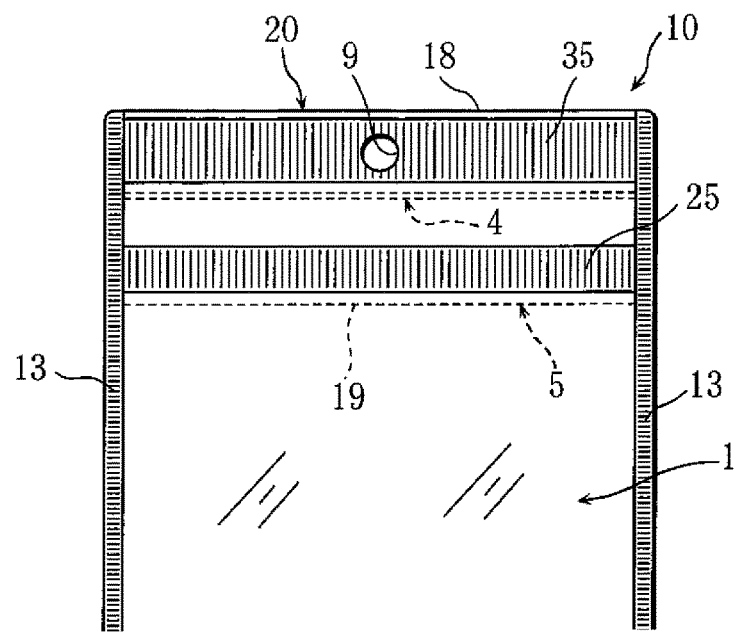
FIG. 20 is a front view of a principal portion showing still another embodiment of the packing bag.

And, as shown in FIG. 20, a through hole 9 for suspension may be disposed on an upper position above the fastener 4. The folded portion 20 keeps sufficient strength for the layering of the first sheet portion 21, the second sheet portion 22, the third sheet portion 23, and the fourth sheet portion 24, the folded portion 20 can support a load without deformation when suspended by a hook inserted to the through hole 9, and the bag is appropriate for suspended display. And, a belt-shaped first welded portion 35 for reinforcement may be formed near the convex folded line portion 18 on one side of the folded portion 20 as to weld the first sheet portion 21 and the second sheet portion 22, and, a belt-shaped second welded portion 35 for reinforcement may be formed near the convex folded line portion 18 on the other side of the folded portion 20 as to weld the third sheet portion 23 and the fourth sheet portion 24. The strength of the folded portion 20 is improved further by the welded portions 35 for reinforcement to certainly support the load of the packing bag.

Figure 21:
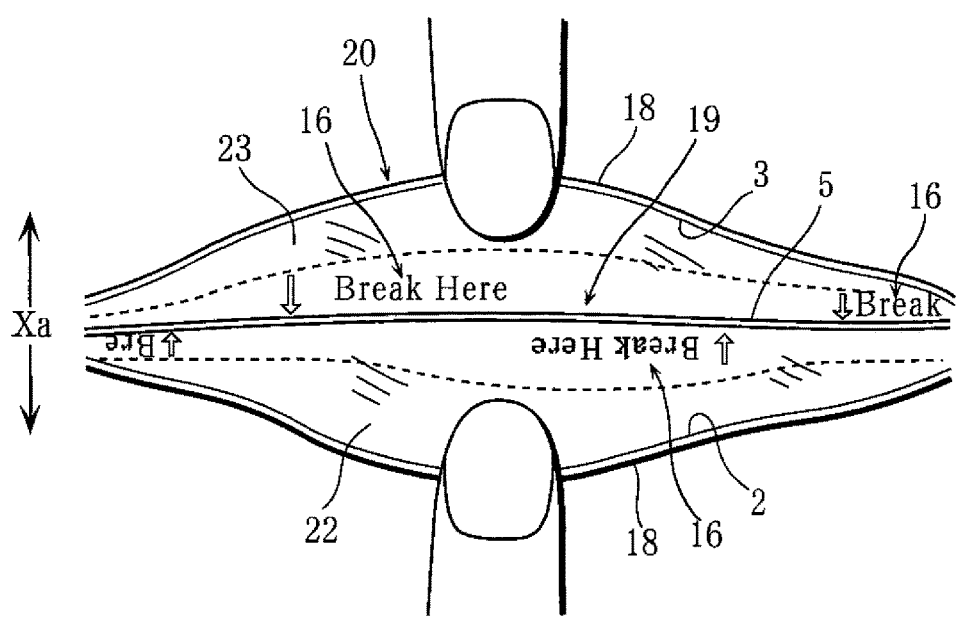
FIG. 21 is an enlarged top view of a principal portion.

And, as shown in FIG. 21, the packing bag of the present invention may be preferably provided with an indicating portion 16 to indicate the breaking on a belt-shaped area near the separation-prepared line portion 5.

The indicating portion 16, concretely, is composed of an arrow (mark) indicating the separation-prepared line portion 5 and a phrase "Break here!". The indicating portion 16, not restricted to the example, the letters and the sign may be changed, and other letters, figures, signs, patterns, and colors may be added. The belt-shaped area near the separation-prepared line portion 5 is a part of or entire belt-shaped area between the chuck tape male portion 2 and the chuck tape female portion 3 of the face 1a of the sheet material 1, and, in other words, a part of or entire inner faces of the second sheet portion 22 and the third sheet portion 23 of the folded portion 20. When the sheet material 1 in rolled state is preliminarily printed with letters and signs on the face 1a, the indicating portion 16 can be disposed on the inner side of the folded portion 20 (the inner faces of the second sheet portion 22 and the third sheet portion 23) by folding the sheet material 1, and the indicating portion 16 can be easily provided with low cost.

The stored article Z is one of articles such as food, medicine, supplement, pet food, cosmetics, or sundries. In the present invention, "welding" is a work in which resins are mutually connected by heat and pressing force without adhesives, and also expressed as "heat press fitting" or "heat welding".

Next, a manufacturing method of the packing bag of the present invention is described.

Figure 22:
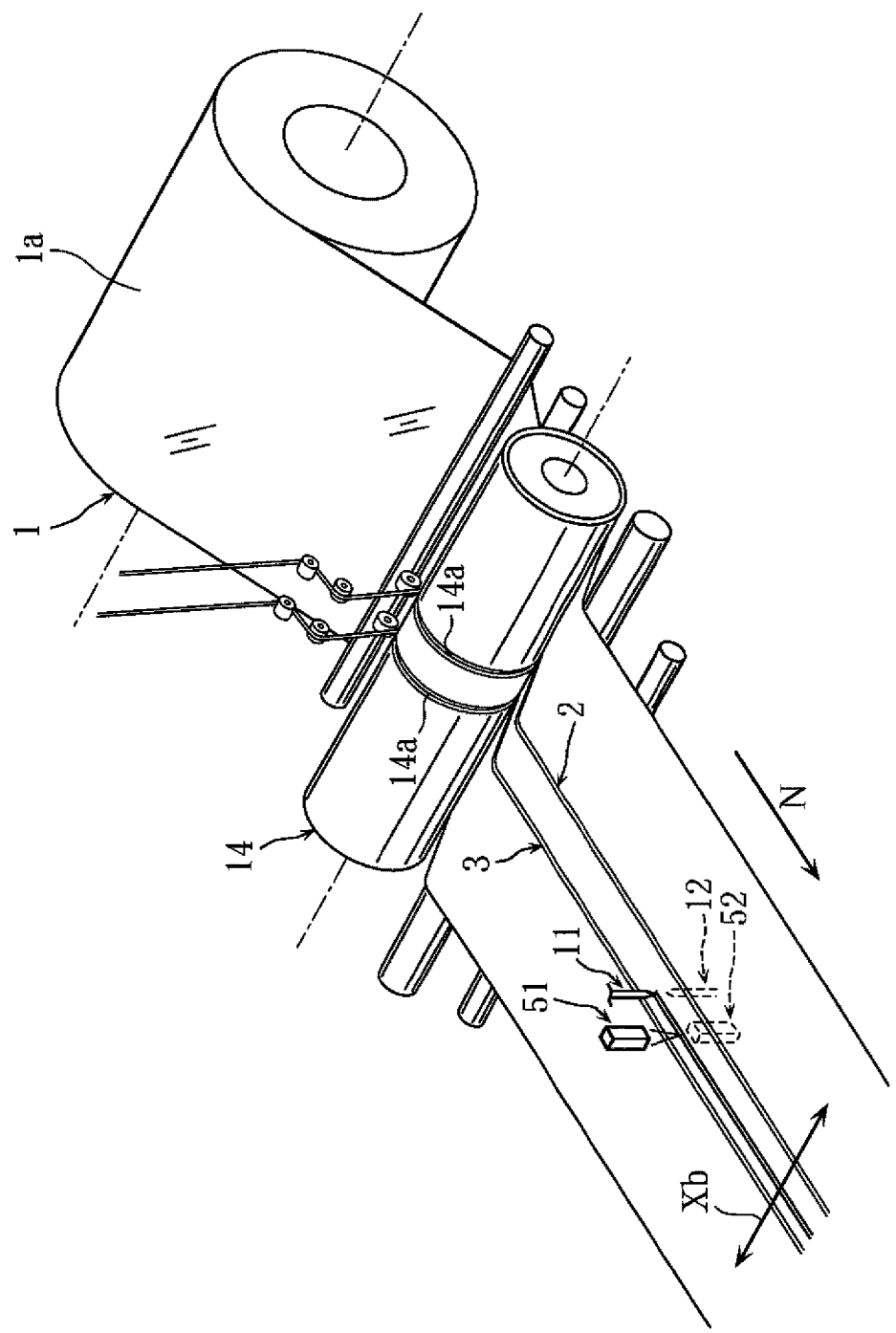
FIG. 22 is a perspective view showing manufacturing method of the packing bag.

As shown in FIG. 22, the sheet material 1 of long belt is continuously run, and, the chuck tape male portion 2 and the chuck tape female portion 3 are disposed parallel on a face 1a of the sheet material 1 along a longitudinal direction to weld. In this chuck tape welding process, the long chuck tape male portion 2 and the chuck tape female portion 3 being continuously sent, are inserted to concave peripheral grooves 14a disposed on a drum 14, and the chuck tape male portion 2 and the chuck tape female portion 3 are welded to the face 1a of the sheet material 1 by giving heat and pressure.

In a preliminary process of the chuck tape welding process, letters, figures, signs, patterns, colors, etc. may be printed on the face 1a of the sheet material 1.

Figure 23:
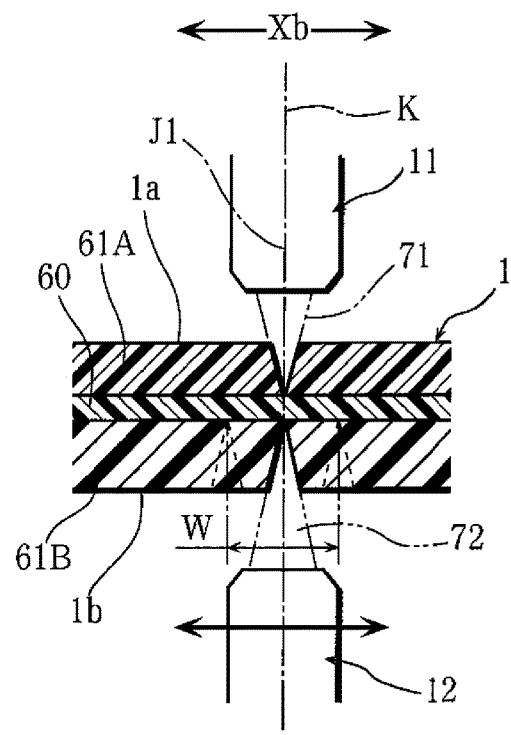
FIG. 23 is an enlarged cross-sectional view of a principal portion showing an example of forming process of the separation-prepared line portion.

As shown in FIG. 22 and FIG. 23, a first laser irradiating portion 11 (called a first irradiating portion 11 below in some cases) to irradiate first laser beam 71 for preliminarily forming the first groove 7A is disposed on the face 1a side of the sheet material 1 after the chuck tape welding process, and, a first groove measuring portion 51 to measure the first depth dimension H1 is disposed near the first irradiating portion 11 and on a downstream side of a sheet running direction N.

And, a second laser irradiating portion 12 (called a second irradiating portion 12 below in some cases) to irradiate second laser beam 72 for preliminarily forming the second groove 7B is disposed on the other face 1b side of the sheet material 1, and, a second groove measuring portion 52 to measure the second depth dimension H2 is disposed near the second irradiating portion 12 and on the downstream side of the sheet running direction N.

Then, on the face 1a of the sheet material 1 of long belt continuously running, the first groove 7A is concaved by the first laser beam 71 irradiated from the first irradiating portion 11 and the first depth dimension H1 is measured by the first groove measuring portion 51. And, on the other face 1b, the second groove 7B is concaved by the second laser beam 72 irradiated from the second irradiating portion 12 and the second depth dimension H2 is measured by the second groove measuring portion 52. This process is called a separation-prepared line portion forming process (laser irradiating process).

Further, in the separation-prepared line portion forming process, the first groove measuring portion 51 and the second groove measuring portion 52 transmit the measurement results to a control portion (an information processing device having a calculating means such as a CPU and a memory means such as RAM and ROM, for example) not shown in figures, and, the control portion controls the first laser beam 71 (first groove depth adjustment parameter such as laser power and focal position) based on the measurement results of the first groove depth dimension H1, and the second laser beam 72 (second groove depth adjustment parameter such as laser power and focal position) based on the measurement results of the second groove depth dimension H2.

Although the continuously running sheet material 1 of belt may be oscillated in the directions of the thickness of the sheet in the separation-prepared line portion forming process (the laser irradiating process), the first and second laser beams 71 and 72 are controlled with feedback based on the measurement results of the first and second groove depth dimensions H1 and H2, the first and second groove depth dimensions H1 and H2 are kept within the above-described first and second depth ranges, and the separation-prepared line portion 5, composed of the first and second grooves 7A and 7B, is formed with the barrier layer 60 barely damaged. That is to say, the barrier function of the barrier layer 60 is certainly kept.

Further, at least one of the first irradiating portion 11 and the second irradiating portion 12 is freely micro reciprocated in sheet width directions Xb. The sheet width directions Xb are the same directions with the bag opening directions Xa of the produced packing bag.

And, the first groove measuring portion 51 and/or the second groove measuring portion 52 are freely micro reciprocated as to follow or simultaneously move with the first irradiating portion 11 and/or the second irradiating portion 12.

In the separation-prepared line portion forming process as shown in FIG. 23, the second irradiating portion 12 is micro reciprocated in the sheet width directions Xb, and the first irradiating portion 11 is fixed (without micro reciprocation).

That is to say, micro reciprocating movement in the sheet width directions Xb is given to the second laser beam 72 to form the second groove 7B of concavo-convex wave on the second layer 61B (the other face 1b), and the first laser beam 71 is fixed without movement in the sheet width directions Xb to form the straight first groove 7A on the first layer 61A (the face 1a).

And, an irradiating axis (light axis) of the second laser beam 72 (the second irradiating portion 12) is micro reciprocated in the sheet width directions Xb with the standard of the first groove width center line J1 (the fold back standard center line K). With this movement, the separation-prepared line portion 5 is formed as shown in FIG. 3 through FIG. 5.

And, the second groove measuring portion 52 is micro reciprocated as to follow or simultaneously move with the second irradiating portion 12 to measure the second groove depth dimension H2.

Figure 24:
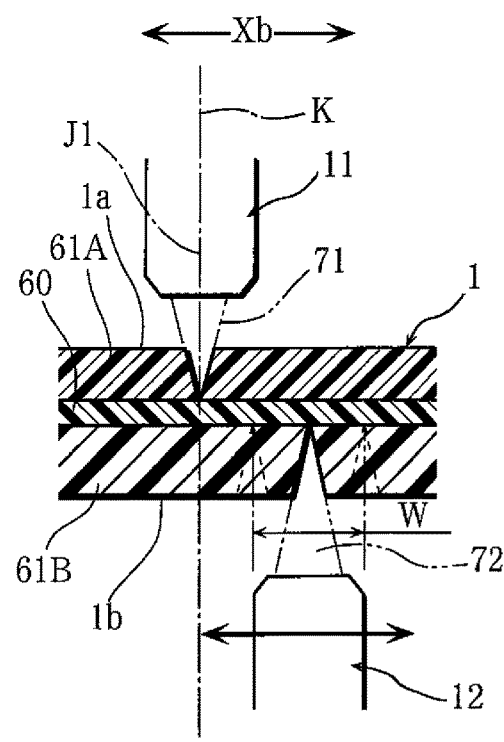
FIG. 24 is an enlarged cross-sectional view of the principal portion showing another example of forming process of the separation-prepared line portion.

Or, as shown in FIG. 24, the second laser beam 72 (the second irradiating portion 12) is disposed on one side of the sheet width directions Xb against the first groove width center line J1, and micro reciprocating movement is made as the second laser beam 72 does not go beyond the first groove width center line J1 (the fold back standard center line K) to form the separation-prepared line portion 5 as shown in FIG. 11 and FIG. 12.

Or, the first irradiating portion 11 and the second irradiating portion 12 are freely micro reciprocated in the sheet width directions Xb, further, the first groove measuring portion 51 is micro reciprocated in the sheet width directions Xb as to follow or simultaneously move with the first irradiating portion 11, and the second groove measuring portion 52 is micro reciprocated in the sheet width directions Xb as to follow or simultaneously move with the second irradiating portion 12.

Figure 25:
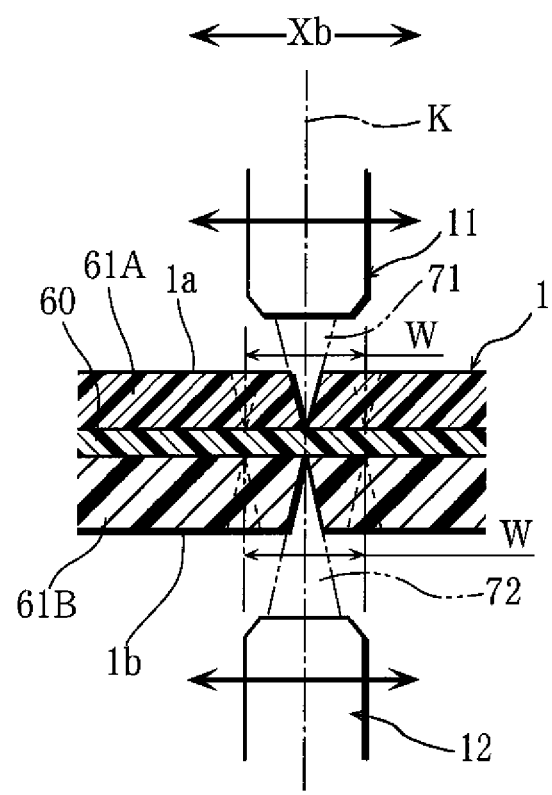
FIG. 25 is an enlarged cross-sectional view of the principal portion showing still another example of forming process of the separation-prepared line portion.

And, as shown in FIG. 25, the first irradiating portion 11 is micro reciprocated in the sheet width directions Xb and the second irradiating portion 12 is micro reciprocated in the sheet width directions Xb to form the separation-prepared line portion 5 as shown in FIG. 13 and FIG. 14.

And, although not shown in figures, the first irradiating portion 11 may be micro reciprocated in the sheet width directions Xb and the second irradiating portion 12 may be fixed (without the micro reciprocating movement). That is to say, the micro reciprocating movement in the sheet width directions Xb may be given to the first laser beam 71 to form the first groove 7A of concavo-convex wave on the first layer 61A, and the second laser beam 72 may be fixed without the movement in the sheet width directions Xb to form the second groove 7B of straight line on the second layer 61B (the other face 1b).

"Micro" of the micro reciprocating movement means a movement amount with which the separation mark 50 explained with FIG. 10 can form concavo-convex wave seeable by naked eyes. Further concretely, the reciprocating movement is conducted with a movement stroke dimension (variable amount) W of 0.3 mm to 2 mm as shown in FIG. 23 through FIG. 25.

And, the first irradiating portion 11 and the second irradiating portion 12 are disposed and fixed to the same position in the sheet width directions Xb (preferably a position corresponding to the fold back standard center line K) to form the separation-prepared line portion 5 as shown in FIG. 15 and FIG. 16.

Or, the first irradiating portion 11 and the second irradiating portion 12 are disposed and fixed to mutually different positions in the sheet width directions Xb (preferably positions on both sides of the fold back standard center line K) to form the separation-prepared line portion 5 as shown in FIG. 17 and FIG. 18.

Figure 26:
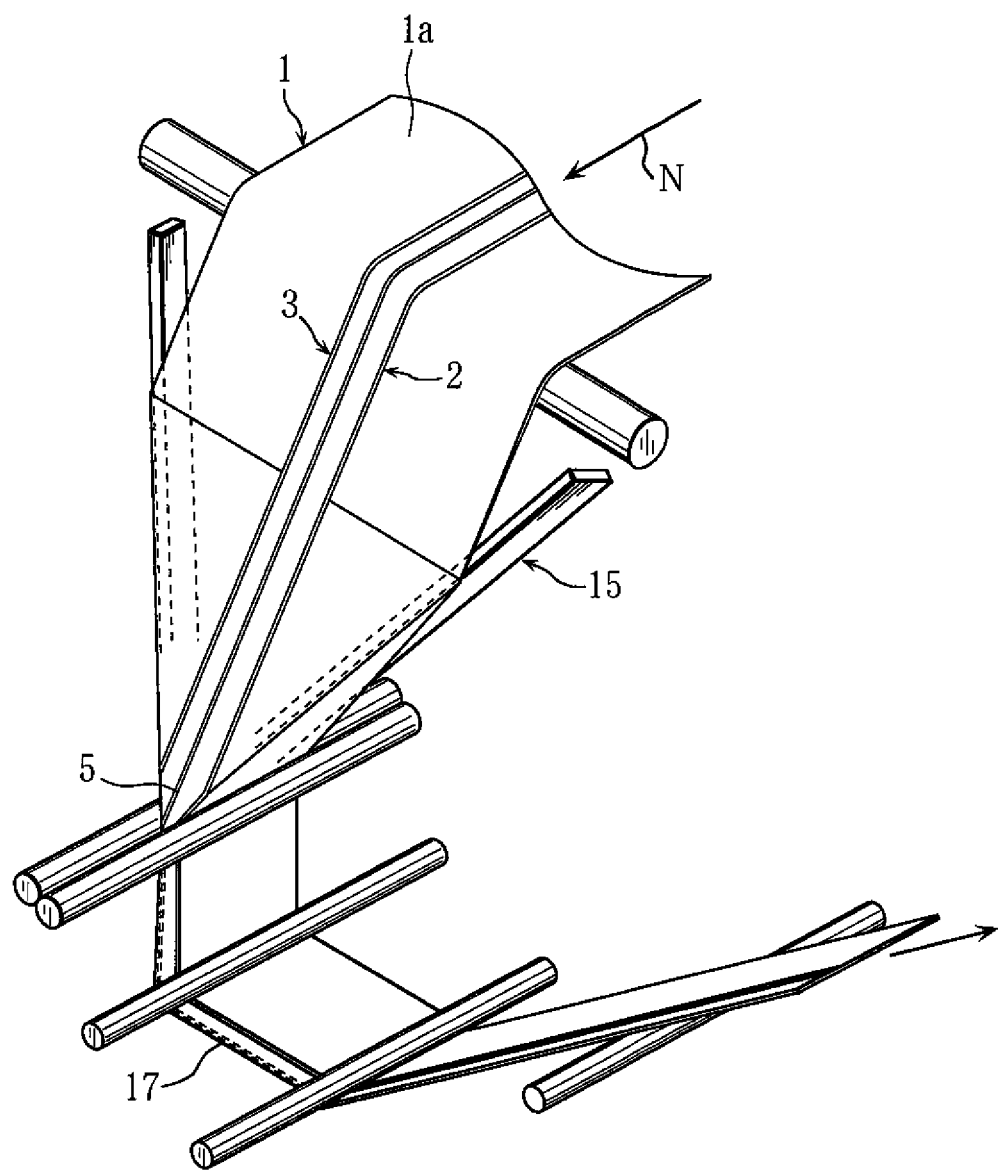
FIG. 26 is a perspective view showing manufacturing method of the packing bag.

After the separation-prepared line portion forming process, as shown in FIG. 26, a fold back process, in which the continuously running sheet material 1 is made sliding on a triangular guiding portion 15 to be folded as to direct the face 1a of the sheet material 1 outward to form a fold back portion 17 (the sheet material 1 is made twofold), is conducted.

Figure 27:
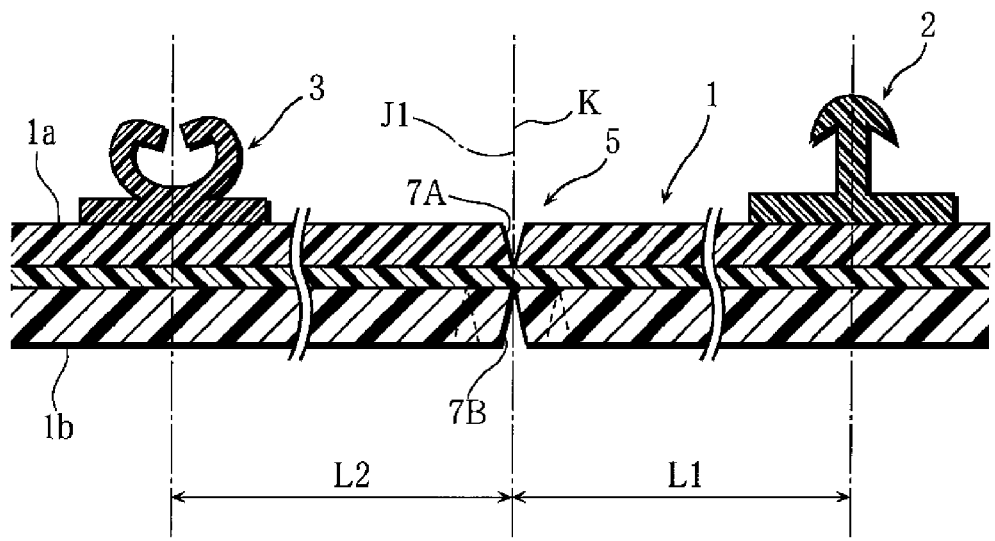
FIG. 27 is an enlarged cross-sectional view of a principal portion.

As shown in FIG. 27, in the separation-prepared line portion forming process, the separation-prepared line portion 5 is formed along the fold back standard center line K between the chuck tape male portion 2 and the chuck tape female portion 3 where a length dimension L1 to the chuck tape male portion 2 and a length dimension L2 to the chuck tape female portion 3 are the same.

Figure 28:
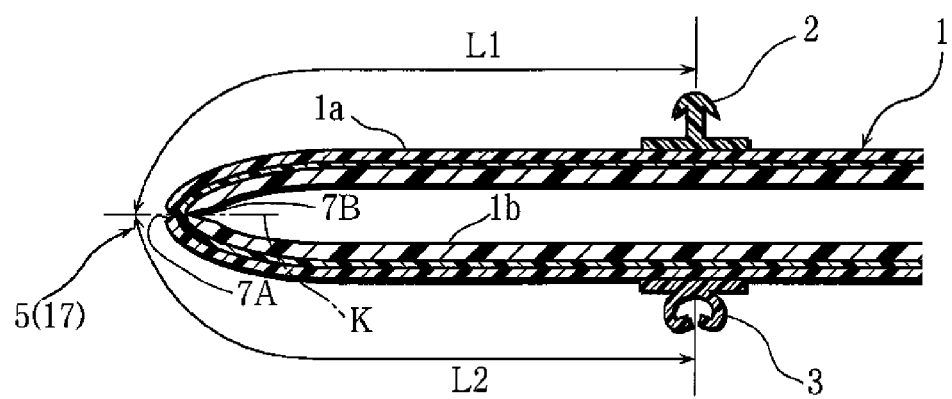
FIG. 28 is an enlarged cross-sectional view of a principal portion.

That is to say, in the fold back process as shown in FIG. 28, the sheet material 1 is folded back along the separation-prepared line portion 5 (folded back on the fold back standard center line K), and, the convex portion of the chuck tape male portion 2 and the concave portion of the chuck tape female portion 3 are directed to mutually opposite directions on the positions of the length dimension L1 and the length dimension L2, the same length from the fold back standard center line K.

Figure 29:
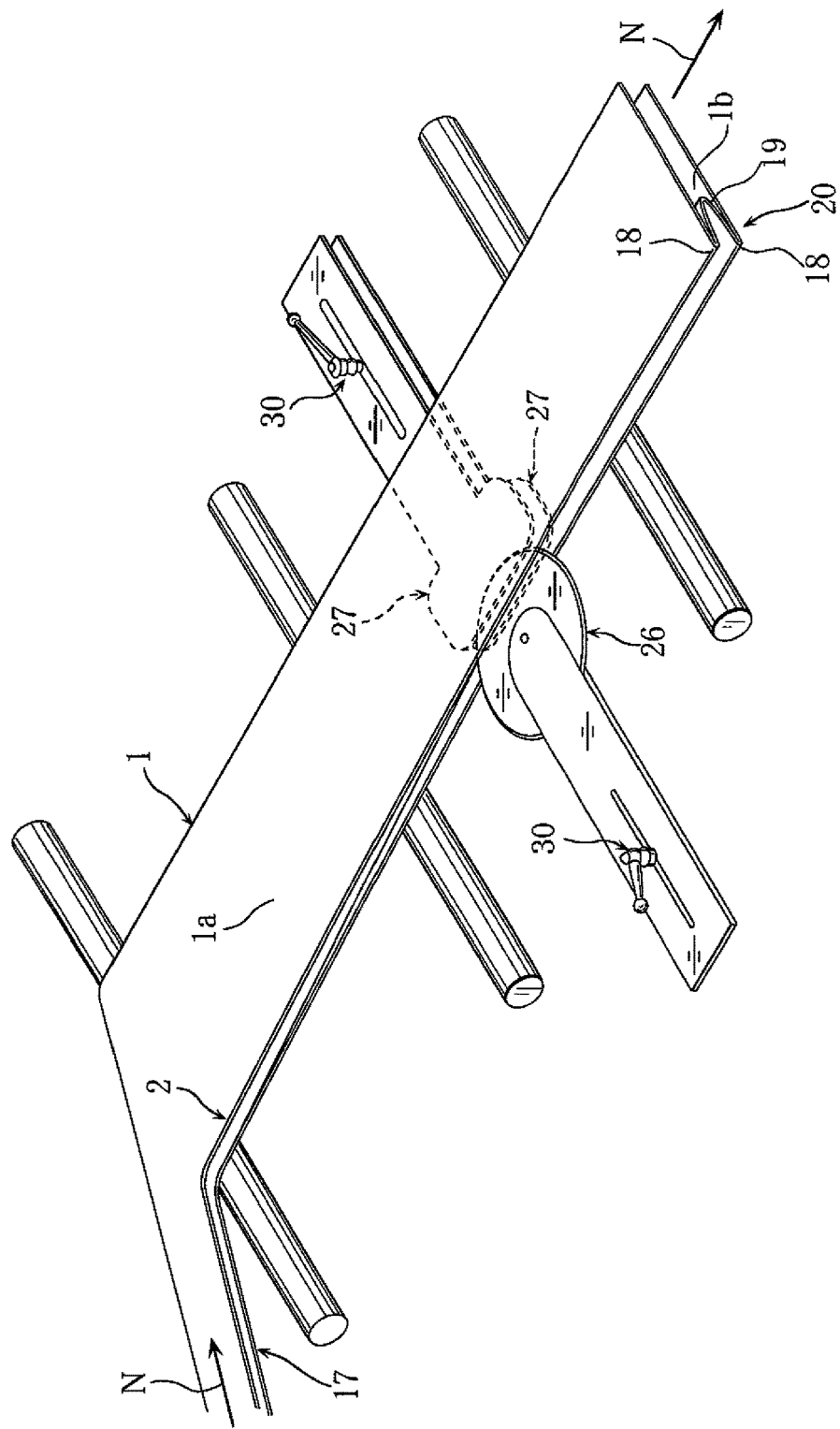
FIG. 29 is a perspective view showing manufacturing method of the packing bag.

Then, after the fold back process as shown in FIG. 29, a guiding roller 26 for push-in is applied from outside (the face 1a) of the fold back portion 17 of the sheet material 1, a pair of guiding members 27, to which the guiding roller 26 is inserted, is applied from the inner side (the other face 1b) of the sheet material 1, and the sheet material 1 is folded along the two convex folded line portions 18 and the concave folded line portion 19 to form the folded portion 20 of which cross section is M-shaped. In this case, the separation-prepared line portion 5 formed on a middle position between the chuck tape male portion 2 and the chuck tape female portion 3 is disposed to accurately correspond to the concave folded line portion 19 (folding process).

In the folding process, the depth dimension from the convex folded line portions 18 to the concave folded line portion 19 of the folded portion 20 can be freely changed by an adjustment means 30 to adjust the insertion depth of the guiding roller 26 and the guiding members 27.

Figure 30:
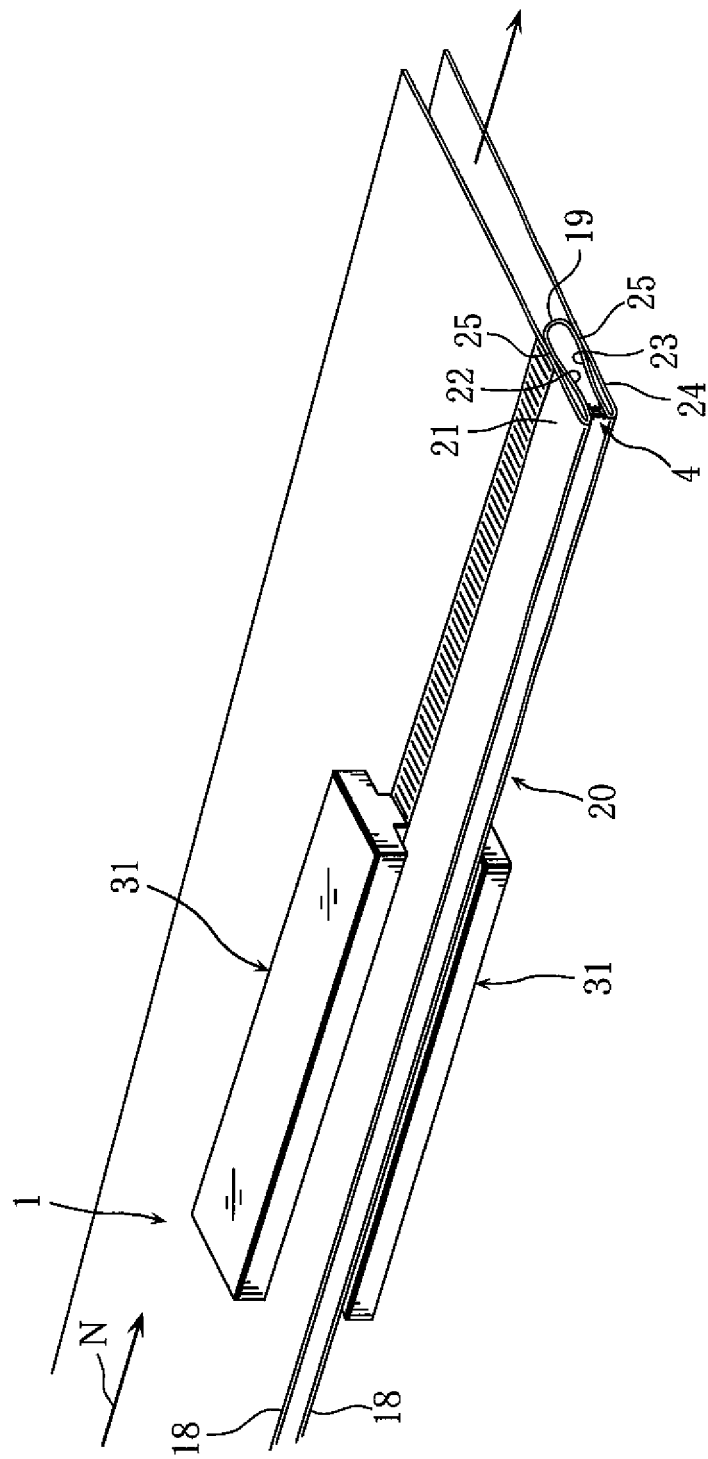
FIG. 30 is a perspective view showing manufacturing method of the packing bag.

Then, after the folding process, the sheet material 1 in continuous running is switched to intermittent feeding by a feeding speed regulating device (not shown in figures), and, as shown in FIG. 30, folded portion welding process, in which the first sheet portion 21 and the second sheet portion 22 are mutually welded, and the third sheet portion 23 and the fourth sheet portion 24 are mutually welded by welded portion forming means 31 pressed to the folded portion 20 on outer sides (upper and lower sides) of the bag, is conducted.

Figure 31:
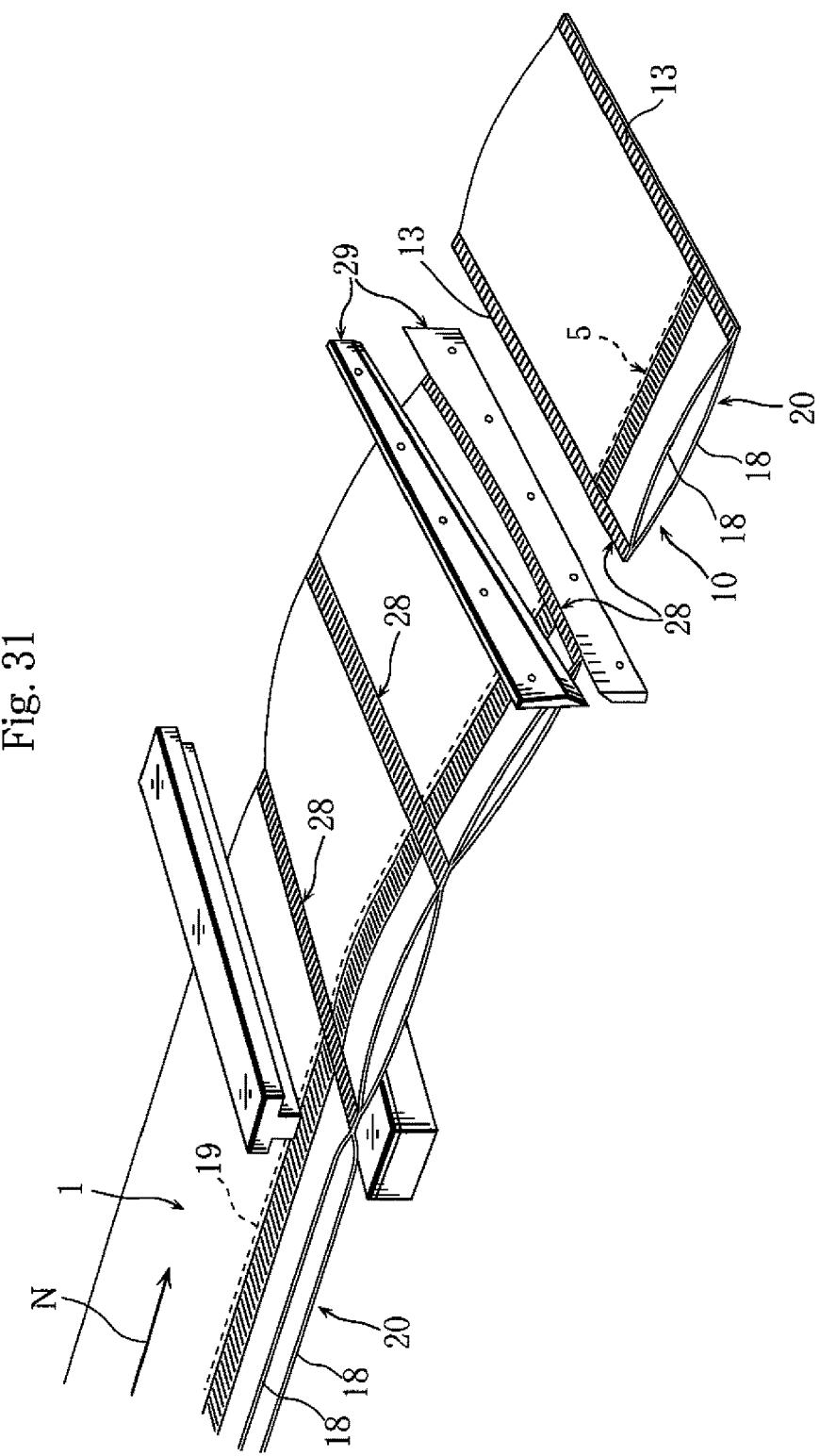
FIG. 31 is a perspective view showing manufacturing method of the packing bag.
Figure 32:
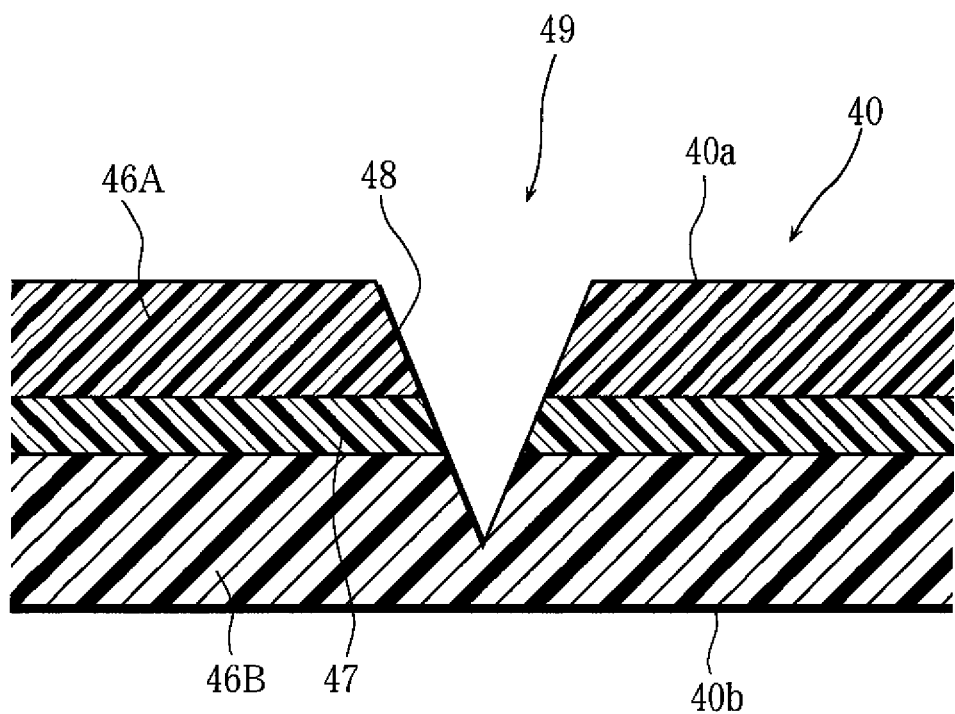
FIG. 32 is an enlarged cross-sectional view of a principal portion showing a conventional packing bag.

After the folded portion welding process, as shown in FIG. 31, welded portions 28 in material width direction are serially formed with predetermined pitch for the entire length in width direction of the sheet material 1 after the forming of the folded portion 20, and the sheet material 1 is cut on a center position of the welded portion 28 in the material width direction by a cutting means 29. The welded portion 28 in the material width direction becomes the welded side edge portion 13 of the bag.

In the produced packing bag, left and right side edge portions (bag side edge portions) 13 are welded, and a side portion on the folded portion 20 (the opening-prepared side portion 10) is closed. And, a side portion opposite to the opening-prepared side portion 10 is open as the bottom opening portion to store the stored article Z in the bag with tight seal.

And, the sheet material 1 may be cut by "weld cutting" in which the cutting is conducted simultaneously with the forming of the welded portion 28. And, after the cutting process, 2 parts composing the slider 8 may be combined (connected) to be attached to the folded portion 20 to make the packing bag. That is to say, the slider 8 may be attached after the cutting of the welded portion 28 in width direction to make the packing bag.

In the present invention, being modifiable, the welded portions 25 shown in FIG. 1, for example, may be omitted. And, although not shown in figures, two packing bags may be made of one sheet material 1.

As described above, the stored article Z can be stored with tight seal without damaging the barrier function of the barrier layer 60 because the packing bag of the present invention is a packing bag to store the stored article Z with tight seal by the welded sheet material 1 of resin in which the separation-prepared line portion 5, separable by the predetermined tensile force F by human hands to take out the stored article Z, is provided along the opening-prepared side portion 10, the sheet material 1 has the layered unit construction in which the first and second welding resin layers 61A and 61B are disposed on the both sides, and the barrier layer 60 is disposed on the middle position, the separation-prepared line portion 5 is composed of the half-cut first laser-worked groove 7A concaved on the first welding resin layer 61A and the half-cut second laser-worked groove 7B concaved on the second welding resin layer 61B, and, the first and second laser-worked grooves 7A and 7B are formed barely damaging the barrier layer 60. The barrier function such as waterproof (water cutting), air-tightness, and gas barrier can be certainly kept, and the stored article Z can be stored for a long period of time under safe and appropriate conditions. And, the bag can be easily and smoothly opened after the storing with tight seal.

And, the separation mark 50 can be seen after the separation of the separation-prepared line portion 5, and the judgment (discernment) whether the separation-prepared line portion 5 was once opened or not can be made at a glance because at least one of the first laser-worked groove 7A and the second laser-worked groove 7B is formed concavo-convex wave. Prevention of pranks, storing process of the stored article Z with tight seal, and quality check in production can be conducted easily and swiftly.

And, the first and second laser-worked grooves 7A and 7B can be formed with high accuracy, defection in production can be reduced, production efficiency is made stable, and high quality can be maintained because the manufacturing method of packing bag of the present invention is a method to make a packing bag having the separation-prepared line portion 5, separable by predetermined tensile force F by human hands, along the opening-prepared side portion 10, in which the sheet material 1 of long resin, having a layered unit construction in which the first and second welding resin layers 61A and 61B are disposed on both sides, and the barrier layer 60 is disposed on the middle position, is made continuously running, the half-cut first laser-worked groove 7A is concaved on the first welding resin layer 61A of the running sheet material 1 with measuring the first groove depth dimension H1 of the first laser-worked groove 7A and the half-cut second laser-worked groove 7B is concaved on the second welding resin layer 61B with measuring the second groove depth dimension H2 of the second laser-worked groove 7B, and, the first laser beam 71 forming the first laser-worked groove 7A is controlled based on measuring results of the first groove depth dimension H1 and the second laser beam 72 forming the second laser-worked groove 7B is controlled based on measuring results of the second groove depth dimension H2 to form the separation-prepared line portion 5 composed of the first and second laser-worked grooves 7A and 7B barely damaging the barrier layer 60. A packing bag, in which the barrier function such as waterproof (water cutting), air-tightness, and gas barrier can be certainly kept, can be produced. A packing bag, in which the stored article Z can be stored for a long period of time under safe and appropriate conditions, can be produced. And, a packing bag, which is easily and smoothly opened after the storing with tight seal, can be produced.

And, the laser-worked groove of the concavo-convex wave and the separation-prepared line portion 5, with which the separation mark 50 can be seen after the separation, can be obtained because the micro reciprocating movement in the sheet width directions Xb is given to at least one of the first laser beam 71 and the second laser beam 72. The judgment (discernment) whether the separation-prepared line portion 5 was once opened or not can be made at a glance. A packing bag, with which prevention of pranks and quality check in production can be conducted easily and swiftly, can be obtained.

While preferred embodiments of the present invention have been described in this specification, it is to be understood that the invention is illustrative and not restrictive, because various changes are possible within the spirit and indispensable features.

What is claimed is:

1. A packing bag to store a stored article with tight seal by a welded sheet material of resin comprising a construction in which:
   a separation-prepared line portion, separable by predetermined tensile force by human hands to take out the stored article, is provided along an opening-prepared side portion;
   the sheet material has a layered unit construction in which first and second welding resin layers are disposed on both sides, and a barrier layer is disposed on a middle position;
   the separation-prepared line portion is composed of a half-cut first laser-worked groove concaved on the first welding resin layer and a half-cut second laser-worked groove concaved on the second welding resin layer;
   the first and second laser-worked grooves are formed barely damaging the barrier layer;
   and the first laser-worked groove is formed straight, and the second laser-worked groove is formed in concave-convex wave as to cross the first laser-worked groove in top view.

2. A packing bag to store a stored article with tight seal by a welded sheet material of resin comprising a construction in which:
   a separation-prepared line portion, separable by predetermined tensile force by human hands to take out the stored article, is provided along an opening-prepared side portion;
   the sheet material has a layered unit construction in which first and second welding resin layers are disposed on both sides, and a barrier layer is disposed on a middle position;
   the separation-prepared line portion is composed of a half-cut first laser-worked groove concaved on the first welding resin layer and a half-cut second laser-worked groove concaved on the second welding resin layer;
   the first and second laser-worked grooves are formed barely damaging the barrier layer;
   and the first laser-worked groove is formed straight, and the second laser-worked groove is formed in concave-convex wave and disposed to be apart from the first laser-worked groove without crossing the first laser-worked groove in top view.

3. A packing bag to store a stored article with tight seal by a welded sheet material of resin comprising a construction in which:
   a separation-prepared line portion, separable by predetermined tensile force by human hands to take out the stored article, is provided along an opening-prepared side portion;
   the sheet material has a layered unit construction in which first and second welding resin layers are disposed on both sides, and a barrier layer is disposed on a middle position;
   the separation-prepared line portion is composed of a half-cut first laser-worked groove concaved on the first welding resin layer and a half-cut second laser-worked groove concaved on the second welding resin layer;
   the first and second laser-worked grooves are formed barely damaging the barrier layer; and
   the first and second laser-worked grooves are formed in concave-convex wave, and phases of the concave-convex waves of the first and second laser-worked grooves are made different as to cross the first and second laser-worked grooves in top view.

* * * * *